Dec. 2, 1952 W. J. PARDUCCI 2,620,156
TURBINE ASSEMBLY

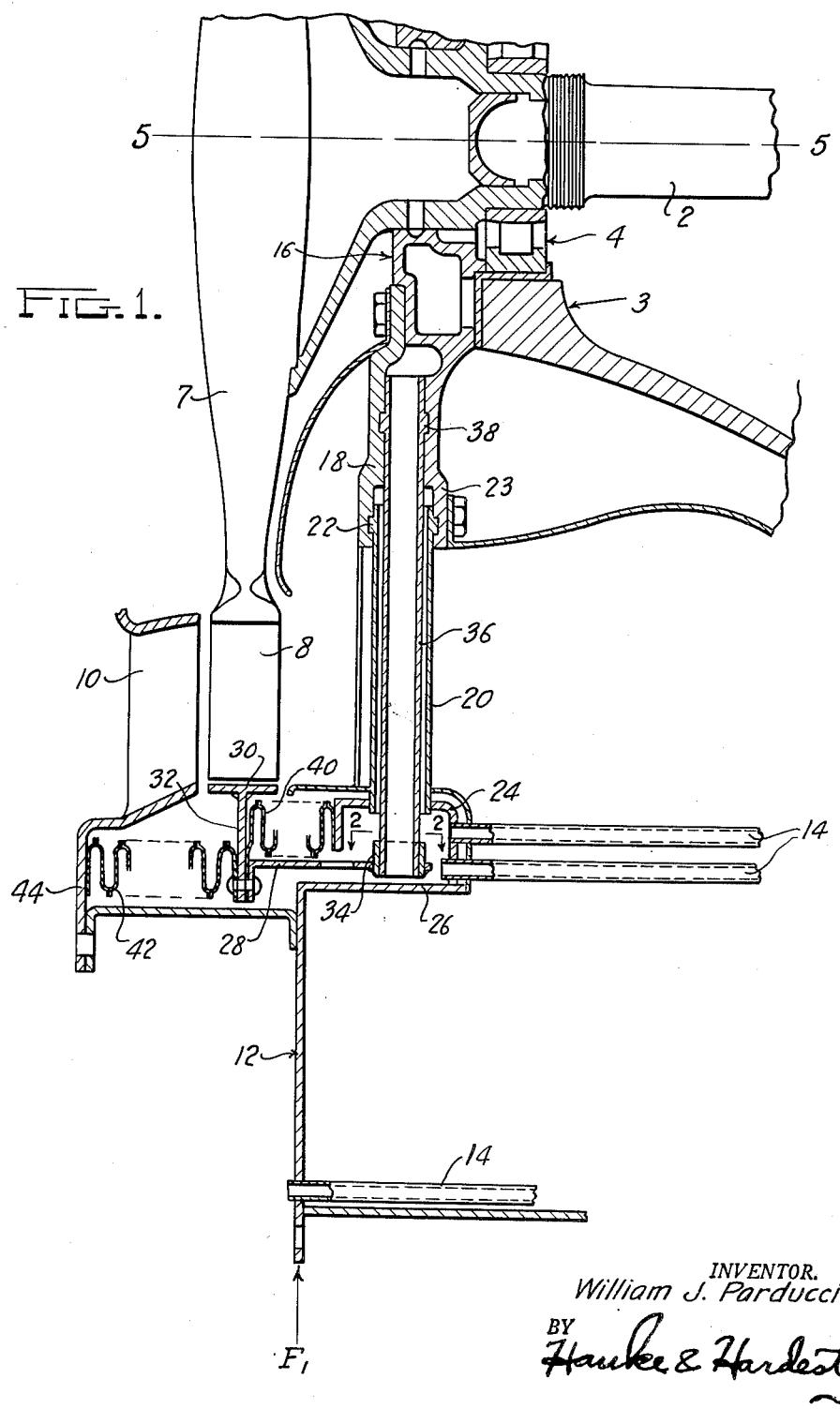

Filed May 9, 1946 2 SHEETS—SHEET 2

INVENTOR.
William J. Parducci
BY
Hauke & Hardesty
ATTORNEYS

Patented Dec. 2, 1952

2,620,156

UNITED STATES PATENT OFFICE 2,620,156

TURBINE ASSEMBLY

William J. Parducci, Detroit, Mich., assignor to Continental Aviation & Engineering Corporation, Detroit, Mich., a corporation of Virginia Application May 9, 1946, Serial No. 668,558

6 Claims. (Cl. 253—39)

This invention relates to a turbine assembly, and in particular to a method of supporting two different parts on the turbine shaft as a reference axis but independently of each other.

One of the many problems facing the turbine designer is that known as "differential expansion." The various parts of the turbine are not brought to their respective operating temperatures at the same rate, resulting in some parts expanding faster than others. The result is often failure of the parts because of the high stresses set up.

It is the object of this invention to set forth a turbine design in which differential expansion among the several parts may take place without damage to the turbine. This is accomplished by an arrangement of parts which permits relative movement in the direction in which the greatest differential expansion is likely to occur, and restrains relative movement along those axes which are least likely to be affected by differential expansion. At the same time, two or more element supports are mounted on the shaft independently of each other. An element such as a nozzle diaphragm mounted on one of the supports will not affect, by differential expansion, another element, such as a turbine blade rim, carried by the second support.

In the drawings:

Fig. 1 is a longitudinal section through a portion of the turbine.

Figure 3:
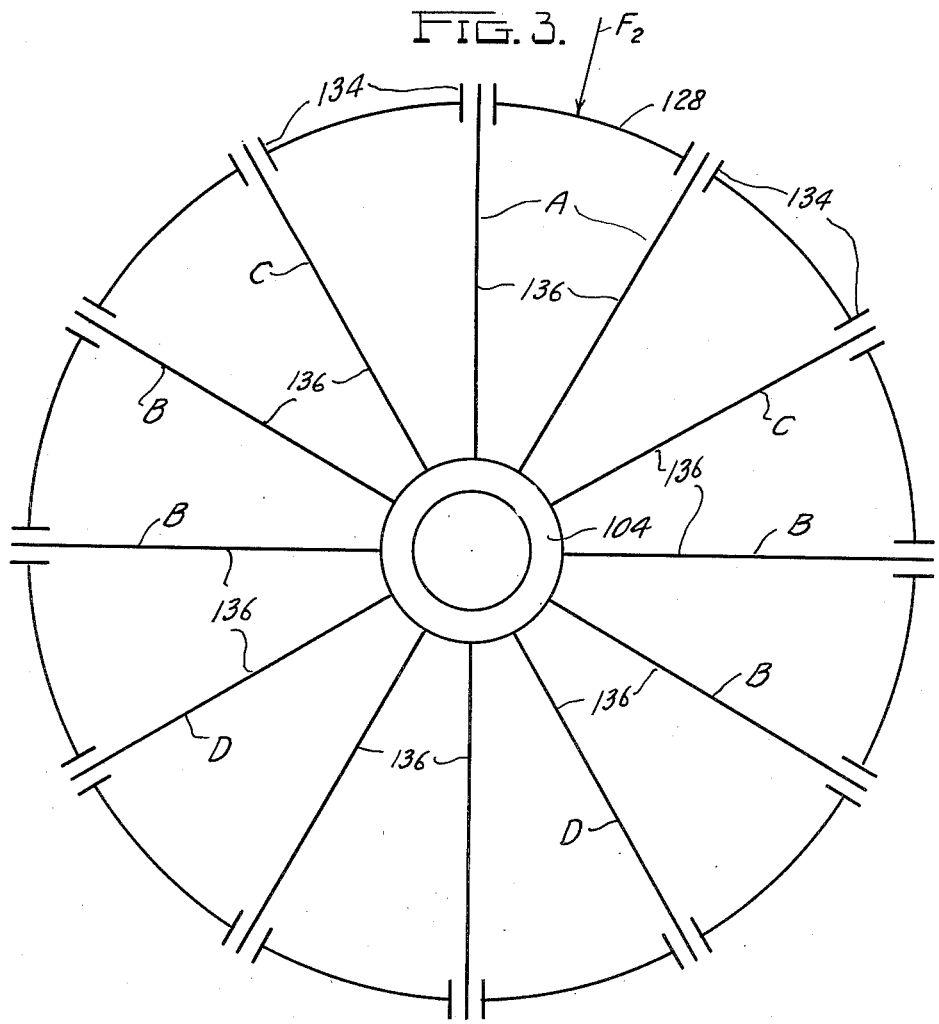
Fig. 3 is a diagram which will be used to explain the forces involved in the operation of the invention in connection with those forces.
Figure 2:
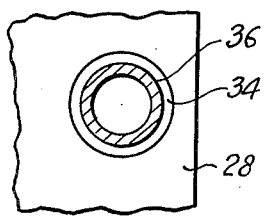
Fig. 2 is a section on line 2—2 of Fig. 1.

Referring now particularly to Fig. 1, a turbine shaft 2 is rotatably mounted in a support 3 which constitutes the main turbine casing. Shaft 2 is rotatable in the casing 3 by virtue of a antifriction bearing 4. The axis 5—5 of shaft 2 serves as a reference axis from which other turbine elements are located.

A turbine wheel 7 is mounted on the end portion of the shaft 2 and carries at its periphery a plurality of turbine blades 8 (sometimes referred to as "buckets"). Turbine blades 8 are positioned to receive energy fluid from a nozzle or plurality of nozzles 10 which conventionally are formed as parts of a diaphragm 44 not shown here in full. Nozzles 10 are largely supported by a turbine element support 12 in which are likewise supported heat exchanger tubes 14.

A non-rotatable hub 16 is supported directly on the shaft 2. Hub 16 extends outward radially and supports a plurality of tubular members 20 by means of an annular ridge 22 on each tube which cooperates with an annular groove near the outer edge 23 of hub 16 and its cooperating clamping member 18. Tubular support members 20 are radially disposed and circumferentially spaced about shaft 2 in hub 16. Support 20 is welded so as to be integral with bracket or annular rim 24 which in turn is welded to its associated member 26, and member 26 is integral with turbine element support 12.

A second turbine element annular support 28 carries a turbine element such as the blade rim 30. Rim 30 is secured to support 28 by a ring 32. As will be well understood by those skilled in the art, blade rim 30 extends all around wheel 7 very close to the outer ends of blades 8. The clearance between blades 8 and the rim 30 should be as little as possible to prevent energy losses due to gases escaping through the clearance without doing any work on the turbine rotor.

A series of sleeves 34 are carried integral with turbine element support 28, which sleeves 34 are radially aligned with a second set of tubular supports 36. Each support 36 has at its end near the shaft an annular ridge 38 which cooperates with an annular recess in the hub 16 and its associated clamping member 18. As in the case of supports 20, the supports 36 are radially disposed and circumferentially spaced about the shaft. In order to save space, supports 20 and 36 are preferably coaxial as shown. Supports 36 are not secured to sleeves 34, but fit slidably in those sleeves to permit radial movement relatively thereto on account of expansion of the supports 36 due to heating. Although the fit between sleeves 34 and supports 36 is such as to permit relative radial movement, the fit is nevertheless sufficiently snug to prevent relative axial and circumferential movement between the sleeves and the supports.

In order to prevent gas leakage, flexible seals 40 and 42 extend from element support 28 to adjacent bracket 24 and nozzle diaphragm ring 44.

Operation

It will be seen from Fig. 1 that turbine element support 12 and its components and element support 28 both have the same reference axis 5—5 but are otherwise independent of each other. A force $F_1$ transmitted to the casing does not affect element support 28 because the force is transmitted directly to the shaft through the radial supports 20. Differential expansion due to unequal heating of the parts is not likely to set up stresses which may cause failure because the supports 36, which will expand radially upon heating, are permitted radial movement relatively to sleeves 34. This permitted expansion or radial movement of supports 36 relatively to sleeves 34 serves to prevent distorting rim 30 out of round. This feature is important because rim 30, to be effective, must be very close to blades 8, as explained above. Any distortion of rim 30 might cause rubbing of the blades. In conventional designs, in which it is necessary for designers to take this factor into account, the designer must provide so much clearance between blades 8 and rim 30 that there is gas leakage through the clearance and consequent loss of efficiency.

Referring now to Fig. 3, it will be seen that the looseness of sleeves 134, on the outer ends of supports 136, has been greatly exaggerated to emphasize the freedom of movement in the radial direction. A force $F_2$ which might for some reason be transmitted to element support 128 is restrained very little by the radial supports marked A, owing to the permitted relative movement in the radial direction. Force $F_2$ will be carried largely by the supports B and to a lesser extent by supports C and D. One force $F_2$ that will readily come to mind is the force of gravity acting on the mass of the various turbine elements 28, 30, 32, 34, and the heat exchanger.

I claim:

1. A turbine engine assembly comprising a nozzle supporting structure, a nozzle held in place by said supporting structure, a shaft, a hub structure concentrically piloted on said shaft, a first and a second set of supports carried by and extending radially outward from said hub structure in substantially uniformly circumferentially spaced relation, said first set of supports being rigidly connected to and concentrically supporting the nozzle supporting structure with respect to the axis of said shaft, a turbine rotor carried by said shaft, a turbine blade rim, and means supporting said turbine blade rim by said second set of supports, said means comprising a series of substantially uniformly circumferentially spaced sleeves carried by said rim and directly radially slidably engaged with said second set of supports, whereby to concentrically locate the turbine blade rim with respect to the shaft axis.

2. A turbine engine assembly comprising a nozzle supporting structure, a nozzle held in place by said supporting structure, a shaft, a hub structure concentrically piloted on said shaft, a first and a second set of supports carried by and extending radially outward from said hub structure in substantially uniformly circumferentially spaced relation, said first set of supports being rigidly connected to and concentrically supporting the nozzle supporting structure with respect to the axis of said shaft, a turbine rotor carried by said shaft, a turbine blade rim, and means supporting said turbine blade rim by said second set of supports, said means comprising a series of substantially uniformly circumferentially spaced sleeves carried by said rim and directly radially slidably engaged with said second set of supports, whereby to concentrically locate the turbine blade rim with respect to the shaft axis, each of said first and second set of supports comprising radially extending elements, the elements of the first set of supports being coaxially disposed with respect to the second set of supports and with the sleeves aforesaid.

3. A turbine engine assembly comprising a nozzle supporting structure, a nozzle held in place by said supporting structure, a shaft, a hub structure concentrically piloted on said shaft, a first and a second set of supports carried by and extending radially from said hub structure and the supports of each of said sets being substantially uniformly circumferentially spaced, said first set of supports being secured to and concentrically supporting the nozzle supporting structure with respect to the axis of said shaft, a turbine rotor carried by said shaft, a turbine blade rim circumferentially encircling said rotor, means supporting said turbine blade rim by said second set of supports, said means comprising a series of substantially uniformly circumferentially spaced sleeves carried by said rim and directly radially slidably engaged with said second set of supports, whereby to concentrically locate the turbine blade rim with respect to the shaft axis, and a bellows type longitudinally extensible cylindrical sealing structure secured at one end to the nozzle supporting structure and at the other end to said turbine blade rim.

4. In a turbine assembly, the combination of a rotatably mounted shaft; a peripherally bladed turbine rotor rigidly carried by said shaft; a hub journalled on said shaft; a pair of non-rotatable turbine elements disposed adjacent said rotor and subject to temperature conditions which result in unequal expansion of the respective elements, such elements comprising a nozzle structure and a rim encircling the rotor blades in closely spaced relation thereto; two sets of circumferentially spaced arms rigidly carried by and extending radially outward from said hub; an annular support connected to said nozzle structure and fixedly carried by one of said sets of arms in concentric relation to said shaft; a separate annular support mounting said blade-encircling rim and radially slidably mounted on the other of said sets of arms; and bellows type sealing means interposed between and connecting said supports.

5. A turbine engine assembly comprising a nozzle supporting structure; a nozzle held in place by said supporting structure; a shaft; a hub structure concentrically piloted on said shaft; a first and a second set of supporting arms carried by and extending radially outward from said hub structure, the arms of each set being substantially uniformly circumferentially spaced, said first set of supporting arms being fixedly connected to and concentrically supporting the nozzle supporting structure with respect to the axis of said shaft; a turbine rotor carried by said shaft; a turbine blade rim circumferentially encircling said rotor; and means supporting said turbine blade rim by said second set of supporting arms, said means comprising a series of substantially uniformly circumferentially spaced sleeves carried by said rim and directly slidably engaged with said second set of arms, whereby to concentrically locate the turbine blade rim with respect to the shaft axis.

6. A turbine engine assembly comprising a nozzle supporting structure; a nozzle held in place by said supporting structure; a shaft; a hub structure concentrically piloted on said shaft; a first and a second set of tubular circumferentially spaced supporting arms carried by and extending radially outward from said hub structure, the arms of said first set being coaxial with and surrounding the complementary arms of the second set, said first set of supporting arms being secured to and concentrically supporting the nozzle supporting structure with respect to the axis of said shaft; a turbine rotor carried by said shaft; a turbine blade rim circumferentially encircling said rotor; and means supporting said turbine blade rim by said second set of supporting arms, said means comprising a series of substantially uniformly circumferentially spaced sleeves carried by said rim and directly radially slidably engaged with said second set of supporting arms, whereby to concentrically locate the turbine blade rim with respect to the shaft axis.

WILLIAM J. PARDUCCI.

REFERENCES CITED

The following references are of record in the file of this patent:

UNITED STATES PATENTS

| Number | Name | Date |
|---|---|---|
| 200,471 | Northrup | Feb. 19, 1878 |
| 805,720 | Fulton | Nov. 28, 1905 |
| 830,393 | Wilkinson | Sept. 4, 1906 |
| 1,061,672 | Hodgkinson | May 13, 1913 |
| 1,479,656 | Fetterley | Jan. 1, 1924 |
| 1,881,556 | Heggem | Oct. 11, 1932 |
| 2,402,418 | Kroon | June 18, 1946 |
| 2,414,788 | Altorfer et al. | Jan. 28, 1947 |
| 2,497,049 | Soderberg | Feb. 7, 1950 |